(12) United States Patent
Adas et al.

(10) Patent No.: US 7,955,071 B1
(45) Date of Patent: Jun. 7, 2011

(54) APPARATUS FOR INJECTION MOLDING

(75) Inventors: James O. Adas, Clinton Township, MI (US); Trevor Pruden, Windsor (CA)

(73) Assignee: DME Company LLC, Madison Heights, MI (US)

( * ) Notice: Subject to any disclaimer, the term of this patent is extended or adjusted under 35 U.S.C. 154(b) by 37 days.

(21) Appl. No.: 12/627,083

(22) Filed: Nov. 30, 2009

(51) Int. Cl.
B29C 45/23 (2006.01)
(52) U.S. Cl. .................................. 425/564; 425/566
(58) Field of Classification Search .............. 425/562, 425/563, 564, 565, 566
See application file for complete search history.

(56) References Cited

U.S. PATENT DOCUMENTS

| | | | |
|---|---|---|---|
| 4,652,230 A | 3/1987 | Osuna-Diaz | |
| 5,700,499 A | 12/1997 | Bauer | |
| 5,849,343 A * | 12/1998 | Gellert et al. | 425/549 |
| 5,984,661 A * | 11/1999 | Vorkoper | 425/562 |
| 6,769,901 B2 | 8/2004 | Babin et al. | |
| 7,128,566 B2 * | 10/2006 | Babin | 425/562 |
| 7,513,772 B2 | 4/2009 | Fairey et al. | |

FOREIGN PATENT DOCUMENTS

| EP | 153592 | * | 1/1985 |
|---|---|---|---|
| JP | 05177664 | * | 7/1993 |
| JP | 06023804 | * | 2/1994 |

* cited by examiner

Primary Examiner — Tim Heitbrink
(74) Attorney, Agent, or Firm — John W. Gregg

(57) ABSTRACT

A nozzle assembly for selectably conveying material in a flowable condition to a cavity of a mold assembly comprises a nozzle body, a removable nozzle tip, a valve pin member extending through the nozzle body and having a tip end for selectably forming a seal with a valve seat to selectably prevent passage of material into the mold cavity and a pin guide for guiding the valve pin member, the pin guide being partially received within the nozzle tip and partially received within the nozzle body and having at least one alignment surface on the exterior thereof and cooperating with an aligning surface of the nozzle body to align the pin guide relative to the nozzle body and with an aligning surface of the nozzle tip to align the nozzle tip relative to the pin guide whereby the nozzle tip is aligned relative to the nozzle body.

20 Claims, 3 Drawing Sheets

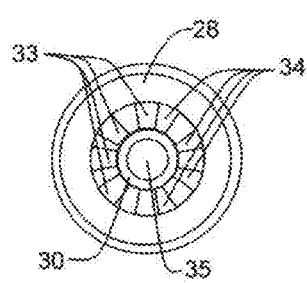
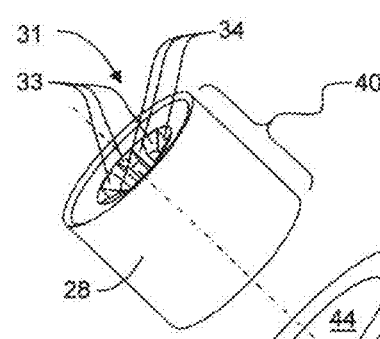
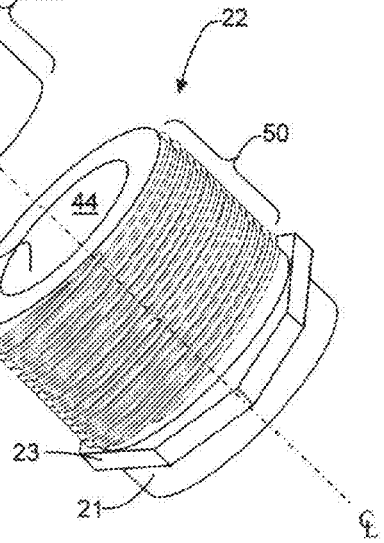
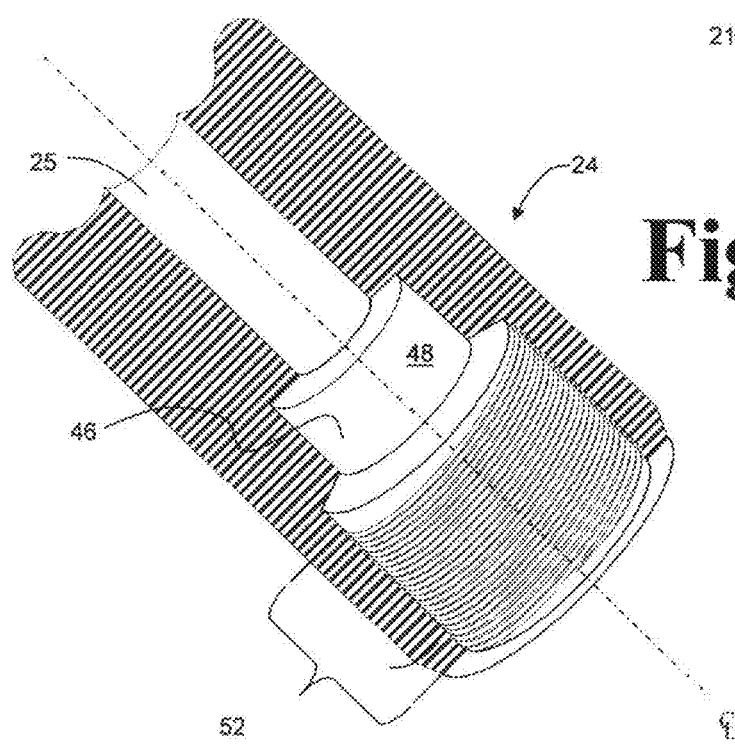
Fig. 4
Fig. 2
Fig. 3

APPARATUS FOR INJECTION MOLDING

BACKGROUND OF THE INVENTION

1. Field of the Invention

This invention relates generally to injection molding. In particular, this invention relates to nozzles for conveying plasticized material to cavities within a mold assembly.

2. Description of Related Art

It is known to provide nozzles to convey material in a flowable condition from, for example, a melt distribution manifold to cavities of a mold assembly wherein a nozzle tip is removably connected with a nozzle assembly and comprises a tip outlet that is in fluid communication with an inlet, a so called "gate", of a mold cavity. It is also known to provide nozzles comprising valve pin members effective to be selectably seated to prevent flow from the nozzle body into a mold cavity. Known constructions of nozzle assemblies comprising removable nozzle tip members are susceptible of misalignment between the nozzle body and nozzle tip that cause misalignment of the nozzle tip relative to a mold block. For example, tilt of the nozzle tip relative to the longitudinal axis of the nozzle body can occur. Further, known constructions of nozzle assemblies comprising valve pin members are susceptible of misalignment between the pin member and the nozzle and/or mold component with which the pin member is to seat, i.e., the valve seat of the nozzle tip or the mold assembly.

Constructions to overcome misalignment of the nozzle body and removable nozzle tip are known wherein an alignment bearing is provided on the nozzle tip and an alignment surface is provided on the nozzle body such that contact of the alignment bearing with the alignment surface is effective to prevent tilt and achieve concentricity of the nozzle tip relative to the longitudinal axis of the nozzle body. In such known constructions, a guide structure for guiding a valve pin member to effect desired alignment of the valve pin tip end and valve seat may comprise elements in tandem with the nozzle tip or at the gate. Because tandem guide members are not aligned by the alignment bearing of the nozzle tip, misalignment, for example, tilt of the guide member relative to the longitudinal axis of the nozzle body, may arise between the guide member and nozzle tip that may result in increased wear of the guide member, valve pin member and valve pin seat.

SUMMARY OF THE INVENTION

It is an object of the present invention to overcome deficiencies of known constructions for effecting alignment of a nozzle tip relative to a nozzle body and for effecting alignment of a valve pin guide member relative to the nozzle body.

It is a further object of the present invention to provide a nozzle assembly comprising a nozzle body, a nozzle tip removably connected to the nozzle body, a valve pin member extending through the nozzle assembly and a valve pin guide member partially received within the nozzle tip and partially received within the nozzle body, the valve pin guide member comprising at least one alignment surface so that with the tip installed in the nozzle body an alignment surface of the guide member is in contact with an interior aligning surface of the nozzle tip and so that an alignment surface of the guide member is in contact with an interior aligning surface of the nozzle body whereby the guide member is aligned relative to the nozzle body and the nozzle tip is aligned relative to the guide member whereby the nozzle tip is aligned relative to the nozzle body.

Further objects and advantages of the invention shall be made apparent from the accompanying drawings and the following description thereof.

In accordance with the aforesaid objects the present invention provides a nozzle assembly for selectably conveying material in a flowable condition to a cavity of a mold assembly, the nozzle assembly comprising: a nozzle body comprising a material inlet and a nozzle passage through the nozzle body in fluid communication with the nozzle inlet; a nozzle tip removably connected to the nozzle body, the nozzle tip comprising a nozzle tip passage through the nozzle tip and ending at a tip outlet, the nozzle tip passage in fluid communication with the nozzle passage when the nozzle tip is connected with the nozzle body and the nozzle tip outlet being in fluid communication with a mold cavity when the nozzle assembly is installed in a mold assembly; a valve pin member extending through the nozzle passage and nozzle tip passage and comprising a tip end portion adapted to form a seal with a valve seat so as to prevent the passage of material into the mold cavity, the valve pin member being translatable in the nozzle body so that the tip end selectably forms a seal with the valve seat; and a guide member partially received within the nozzle tip and partially received within the nozzle body, the guide member having an opening therethrough effective to guide the valve pin member within the nozzle body and guide member passages in fluid communication with the nozzle passage and the nozzle tip passage when the nozzle tip is connected with the nozzle body, the exterior of the guide member comprising at least one alignment surface so that with the tip installed in the nozzle body an alignment surface of the guide member is in contact with an interior aligning surface of the nozzle tip and so that an alignment surface of the guide member is in contact with an interior aligning surface of the nozzle body whereby the guide member is aligned relative to the nozzle body and the nozzle tip is aligned relative to the guide member whereby the nozzle tip is aligned relative to the nozzle body.

BRIEF DESCRIPTION OF THE DRAWINGS

FIG. 2 is a three dimensional exploded view of a nozzle tip and pin guide member illustrated in FIG. 1.

FIG. 3 is a partial cross-sectional view of a portion of a nozzle body illustrated in FIG. 1.

FIG. 4 is an end view of the pin guide member illustrated in FIG. 1.

DETAILED DESCRIPTION OF THE PREFERRED EMBODIMENT

The invention shall be described with reference to a preferred embodiment illustrated in detail. It is not the intention of applicants that the invention be limited to the preferred embodiment, but rather that the invention shall be defined by the appended claims and all equivalents thereof.

Figure 1:
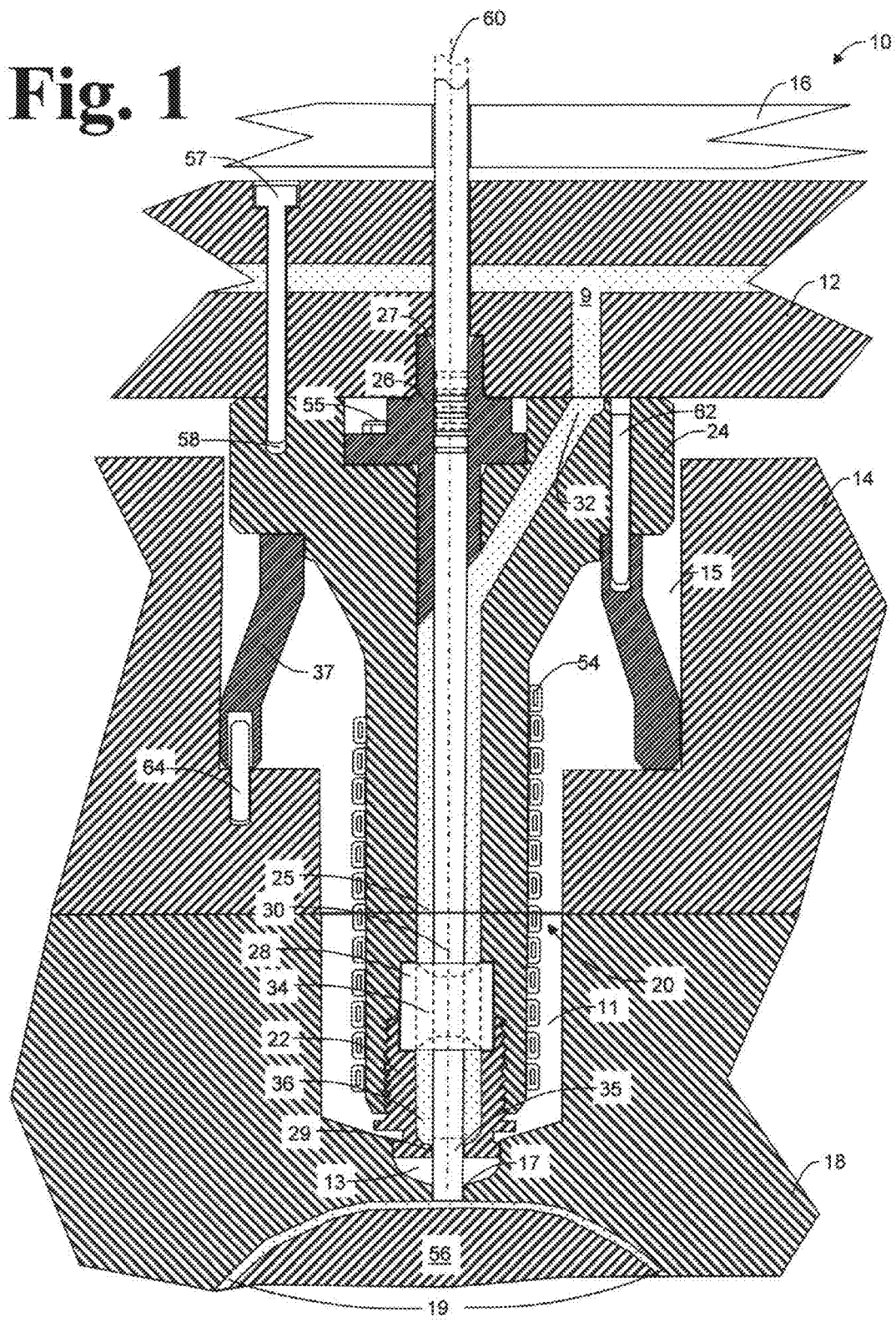
FIG. 1 is a partial cross-sectional view of a mold assembly comprising a nozzle assembly in accordance with the invention.

Referring to FIG. 1, a mold assembly 10 comprises manifold 12, nozzle retainer plate 14 back plate 16 and mold block 18, each of manifold 12, nozzle retainer plate 14, back plate 16 and mold block 18 being referred to herein as a mold member. An article to be molded is defined by surfaces of cavity 19 in mold block 18 and surfaces of core elements such as core 56. Material to be molded may be thermoplastic or other material that is maintained in a flowable condition when at an elevated temperature and is referred to herein as "melt". Melt is admitted to mold assembly 10 and conveyed through distribution channel 9 of manifold 12 to an inlet of at least one nozzle such as nozzle assembly 20. Nozzle assembly 20 is received in receptacle 15 of nozzle retainer plate 14, with the forward end of the nozzle received in nozzle opening 11 in mold block 18. Abutting surfaces of manifold 12 and nozzle body 24 surrounding nozzle inlet 32 are effective to prevent leakage of melt from distribution passage 9 in manifold 12 between manifold 12 and nozzle body 24. Melt is conveyed through nozzle assembly 20 into gate 17 at the entrance of cavity 19 of mold block 18. Abutting contact between the outside circumference of the forward end of nozzle assembly 20 with the inside circumference of nozzle well 13 of mold block 18 is effective to prevent leakage of material from nozzle assembly 20 and cavity 19 past nozzle tip 22. Compressive forces applied to nozzle body 24 by manifold 12 prevent nozzle body 24 being driven axially away from cavity 19 by force acting on the forward end face of nozzle tip 22 from melt entering nozzle well 13 from nozzle body 24.

Continuing with reference to FIG. 1, nozzle assembly 20 is received within receptacle 15 of nozzle retainer plate 14. As is known, nozzle assembly 20 can be attached to manifold 12 by, for example, fasteners such as fastener 57 passing through manifold 12 and engaging a threaded bore in nozzle body 24. The sub-assembly of manifold and nozzle assemblies has the advantage of facilitating assembly of mold assembly 10 by reducing time required to install nozzle assemblies in nozzle retainer plate 14. Advantageously, nozzle assembly 20 is precisely located within receptacle 15 by a skirt establishing a gap between nozzle body 24 and receptacle 15 effective to minimize contact therebetween. Advantageously, the skirt is removable such as removable skirt 37 and the outermost exterior circumference thereof abuts a shoulder in the sidewall of receptacle 15 so as to precisely locate skirt 37 within receptacle 15. As shown in FIG. 1, an inner circumference of removable skirt 37 abuts a shoulder of nozzle body 24 so as to precisely locate nozzle body 24 relative to removable skirt 37. The combination of abutting surfaces of removable skirt 37, nozzle body 24 and receptacle 15 are effective to precisely locate nozzle body 24 within receptacle 15 with a surrounding gap to minimize contact between nozzle body 24 and retainer plate 14. Such minimized contact is effective to reduce heat transfer from nozzle body 24 to nozzle retainer plate 14, improving retention of heat within nozzle body 24 and melt therein. As a consequence of skirt 37 being removable from nozzle body 24 a thermal barrier is interposed (attributable to a thermal boundary effect) at the surfaces of contact between nozzle body 24 and skirt 37. That thermal barrier is effective to further reduce heat transfer from nozzle body 24 to nozzle retainer plate 14. Skirt 37 may be advantageously attached to nozzle body 24 by fasteners (not shown) or retaining rings (not shown). Nozzle assembly 24 is advantageously fitted with heating devices, such as electrical coil heater 54, to maintain melt within nozzle assembly 20 at an elevated temperature as appropriate to maintain a flowable condition thereof. Heating devices may be applied to the shank of nozzle body 24 as shown as well as to the rearward end thereof proximate manifold 12. Further, while shown as applied to the surface of nozzle body 24, heating coils may be fitted within grooves on the surface of nozzle body 24 to improve heat transfer from the heating coils to nozzle body 24. Nozzle opening 11 in mold block 18 is effective to reduce contact between nozzle body 24 and nozzle tip 22 with mold block 18 so as to reduce heat transfer from nozzle body 24 and nozzle tip 22 to mold block 18.

With further reference to FIG. 1, nozzle assembly 20 comprises a valve member, such as valve pin member 30, to permit melt to be selectably conveyed from nozzle inlet 32 into cavity 19. Valve pin member 30 is slidably supported within melt channel 25 through nozzle body 24 and comprises tip end 35 formed to be seated with a valve seat so as to seal off passage of melt from nozzle assembly 20 into cavity 19. In FIG. 1, tip end 35 of valve pin member 30 seats at gate 17 connecting nozzle well 13 with cavity 19. Alternatively, tip end 35 may be formed to seat with a gate formed at the outlet of nozzle tip 22 or at a gate insert received in mold block 18 and comprising gate 17. Advantageously, a pin seal is provided proximate the rearward end of nozzle body 24 to prevent material within melt channel 25 from by-passing valve pin member 30 and exiting nozzle body 24 at the entrance thereof through which valve pin member 30 passes. More advantageously, a pin seal member, such as pin seal member 26 is at least partially received in a recess in the rear end face of nozzle body 24 as illustrated in FIG. 1 so as to permit removal of pin seal member 26 from nozzle body 24 while nozzle assembly 20 remains installed in mold member 14. Pin seal member 26 advantageously comprises a projection protruding into melt channel 25 proximate the junction of melt channel 25 with the melt passage from nozzle inlet 32. That projection is advantageously terminated in an oblique end face in line with the melt passage from nozzle inlet 32 to melt channel 25 as shown. The oblique end face is effective to insure the projection of pin seal member 26 fills volume of melt channel 25 that would otherwise be out of the dominant lines of flow of melt entering melt channel 25 without reducing cross section of the transition of the passage from nozzle inlet 32 to melt channel 25, thereby eliminating interior space where melt flow would otherwise be reduced or impeded. Pin seal member 26 is advantageously secured to nozzle body 24 by one or more fasteners, such as fastener 55, for storage and transport of nozzle assembly 20. As is known, threaded members, such as fastener 55 may also be used to separate pin seal member 26 from nozzle body 24 under circumstances where pin seal member 26 becomes adhered to nozzle body 24 in the course of use. Pin seal member 26 is retained in abutment with nozzle body 24 by compressive forces applied by manifold 12 to pin seal member 26 when nozzle assembly 20 is installed in mold assembly 10.

As shown in FIG. 1, valve pin member 30 passes through bore 27 of pin seal member 26, through a guide structure comprising pin guide 28 and, at least, partially through nozzle tip passage 36 of nozzle tip 22. In the arrangement of FIG. 1, position of forward end 35 of valve pin member 30 relative to gate 17 is effective to selectably enable passage of material from nozzle assembly 20 into mold cavity 19. With valve pin member 30 retracted (shown in dashed lines in FIG. 1) melt flows through nozzle tip outlet 29 into nozzle well 13, from nozzle well 13 into gate 17, and through gate 17 into mold cavity 19 of mold block 18. Gate 17 defines a valve seat at which tip end 35 seats to seal off flow of material into mold cavity 19. With valve pin member 30 advanced (shown in solid lines in FIG. 1) melt is prevented from exiting gate 17 and entering cavity 19 of mold block 18, i.e., tip end 35 of valve pin member 30 forms a seal with gate 17. As shown in FIG. 1, tip end 35 is a cylindrical extension of valve pin member 30 and, when valve pin member 30 is advanced, seats at gate 17 so that the end face of tip end 35 is substantially flush with molding surfaces surrounding gate 17, thereby reducing or eliminating any imperfection in the surface of the molded article attributable to valve pin member 30. Valve pin member 30 is, advantageously, advanced and retracted by an actuating device (not shown) engaging the end of valve pin member 30 opposite forward end 35. Such an actuating device may be operated electrically or with pressurized fluid (gas (pneumatic fluid) or liquid (hydraulic fluid)).

Figure 5A:
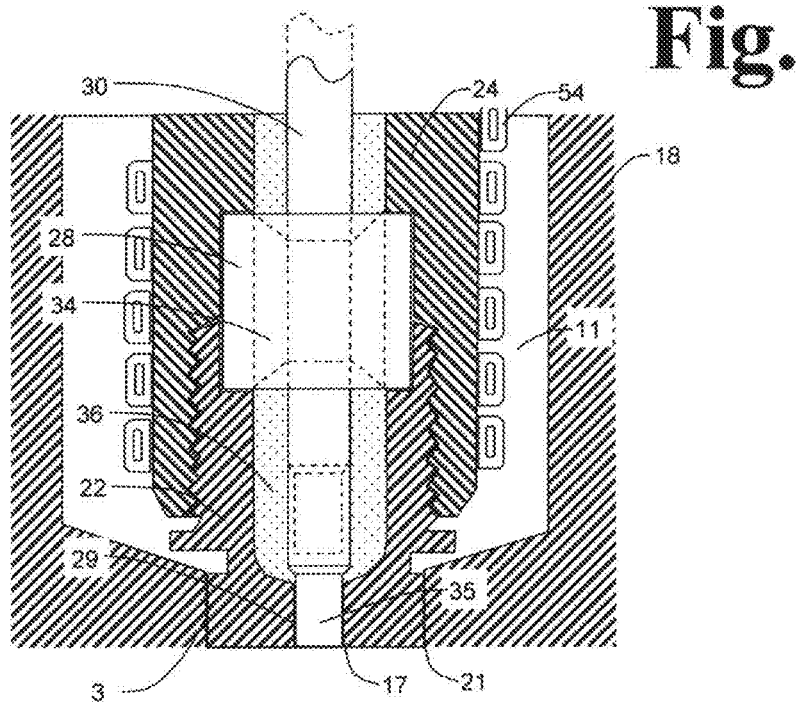
FIGS. 5a and 5b are enlarged cross sectional views of a nozzle tip in accordance with the invention illustrating alternative valve seat arrangements.
Figure 5B:
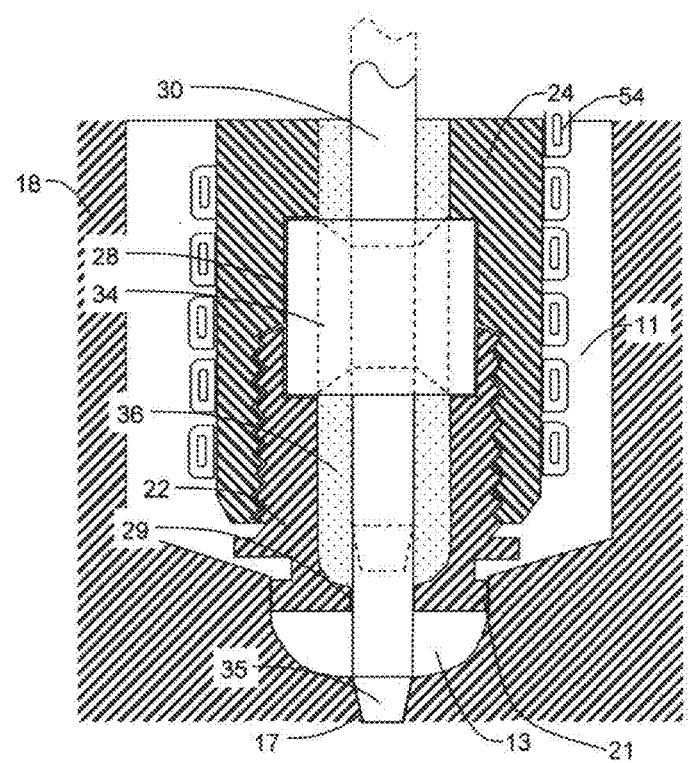

Referring to FIGS. 5a and 5b, alternative arrangements for valve seats are illustrated with conforming valve tip ends 35 of valve member 30. Reference numbers of components of FIG. 1 are duplicated in FIGS. 5a and 5b. FIG. 5a illustrates an alternative arrangement that differs from the arrangement illustrated in FIG. 1 in that nozzle tip outlet 29 comprises gate 17 defining the valve seat where tip end 35 of valve member 30 forms a seal sufficient to prevent passage of melt out of nozzle body 24 into mold cavity 19. The forward end face of nozzle tip 22 forms a portion of molding surfaces defining cavity 19, comprising molding surfaces surrounding gate 17, and is formed to be substantially flush with molding surfaces of mold block 18 surrounding nozzle tip 22 when nozzle assembly 20 is installed in mold assembly 10. Rather than a nozzle well 13 illustrated in FIG. 1, mold block 18 comprises through bore 3 open to cavity 19. The exterior circumference of nozzle tip 22 at seal segment 21 abuts the interior circumference of through bore 3 so as to prevent melt from by-passing nozzle tip 22 and entering nozzle opening 11 of mold block 18. As in FIG. 1, force acting on the forward end face of nozzle tip 22 exposed to cavity 19 is opposed by compressive force applied to nozzle body 24 by manifold 12 so as to prevent displacement of nozzle body 24 away from cavity 19. Tip end 35 in FIG. 5a is illustrated as a cylindrical projection from valve pin member 30, joined thereto by a tapered segment, and of smaller diameter than the portion of valve pin member 30 from which it projects.

Referring to FIG. 5b, an arrangement according to FIG. 1 is illustrated with an alternative tip end 35 seating at gate 17 of mold block 18. In particular, tip end 35 comprises a tapered projection from valve pin member 30. As illustrated in FIG. 1, the exterior circumference of nozzle tip 22 at seal segment 21 abuts the interior circumference of nozzle well 13 so as to prevent melt from bypassing nozzle tip 22 and entering nozzle opening 11 of mold block 18. Further, in the same manner as the construction illustrated in FIG. 1, force acting on the forward end face of nozzle tip 22 from melt entering nozzle well 13 is opposed by compressive force applied to nozzle body 24 by manifold 12. In the same manner as the construction illustrated in FIG. 1, the end face of tip end 35 of FIG. 5b is substantially flush with molding surfaces surrounding gate 17 when valve pin member 30 is advanced to seal off flow of melt into cavity 19.

Referring to FIGS. 2, 3 and 4, nozzle tip 22 is attached to nozzle body 24 so as to be removable therefrom by suitable connecting means such as by engagement of mating threads, for example, external threads 50 of nozzle tip 22 and internal threads 52 of nozzle body 24. Attachment and removal of nozzle tip 22 from nozzle body 24 is effected by relative rotation of the two. Nozzle tip 22 advantageously comprises faceted flange 23 to facilitate rotation of nozzle tip 22 for installation and removal from nozzle body 24. Nozzle body 24 is advantageously secured against rotation about its longitudinal axis when installed in mold assembly 10 to facilitate relative rotation of nozzle tip 22 and nozzle body 24. Nozzle body 24 may be secured against such rotation by, for example, a fastener, for example fastener 57 (FIG. 1). In circumstances where such fasteners are not used, nozzle body 24 may be secured from rotation by, for example, a combination of a dowel or pin such as pin 62, projecting through nozzle body 24 into skirt 37 and a dowel or pin, such as pin 64 engaging skirt 37 and nozzle retainer plate 14. As shown in FIG. 1, pin 64 is advantageously received in a slot in skirt 37 whereby rotation of skirt 37 is prevented but location of skirt 37 relative to receptacle 15 is not affected and pin 62 is located sufficiently close to locating surfaces of skirt 37 and nozzle body 24 that pin 62 does not disturb the precision of location of nozzle body 24 relative to skirt 37. A further alternative to prevent rotation of nozzle body 24 comprises a flat or facet (not shown) on at least one of nozzle body 24 and skirt 37 and a cooperating flat on at least one of receptacle 15 and a locking member (not shown) attached to nozzle retainer plate (as known from, for example, U.S. Pat. No. 4,653,995) so that the cooperating flat engages the flat or facet of nozzle assembly 20.

Continuing with reference to FIGS. 2, 3 and 4, an opening 31 through pin guide 28 comprises interior guide vanes, such as longitudinal vanes 33 projecting toward the central longitudinal axis of pin guide 28. When pin guide 28 is installed in nozzle assembly 20, the exterior surface of valve pin member 30 is in sliding contact with the exposed innermost surfaces of guide vanes 33 (FIGS. 2 and 4). Contact of the exterior surface of valve pin member 30 with the innermost surfaces of guide vanes 33 defines passages 34 adjacent guide vanes 33 through pin guide member 28 allowing melt to bypass valve pin member 30 and pass through pin guide 28 into nozzle tip passage 36 of nozzle tip 22. At least a portion of exterior surface 40 of pin guide 28 is finished so as to function as an alignment surface. At least a portion of internal wall 42 of counter bore 44 of nozzle tip 22 is likewise finished to so as to function as an aligning surface as is at least a portion of internal wall 46 of counter bore 48 of nozzle body 24. Pin guide member 28 is partially received in counter bore 44 so that a portion of pin guide 28 projects beyond the end of nozzle tip 22 into counter bore 48 of nozzle body 24. Alignment of pin guide 28 relative to nozzle body 24 is achieved by contact of an alignment surface portion of the exterior surface 40 of pin guide 28 with an aligning surface portion of internal wall 46 of counter bore 48. Alignment of nozzle tip 22 with pin guide 28 is achieved by contact of an alignment surface portion of exterior surface 40 of pin guide 28 with an aligning surface portion of internal wall 42 of counter bore 44 of nozzle tip 22. Cooperation of alignment surfaces of pin guide 28 and an aligning surface of counter bore 48 is effective to determine tilt of pin guide 28 relative to longitudinal axis 60 (FIG. 1) of nozzle body 24 and concentricity of the exposed innermost surfaces of guide vanes 33 with the longitudinal centerline of nozzle body 24. Further, cooperation of alignment surfaces of pin guide 28 with aligning surfaces of counter bore 44 is effective to determine tilt of nozzle tip 22 relative to pin guide 28 and concentricity of nozzle tip outlet 29 with the longitudinal centerline of pin guide 28. Hence, tilt of nozzle tip 22 relative to longitudinal axis 60 of nozzle body 24 and concentricity of nozzle tip outlet 29 with longitudinal axis 60 are determined by cooperation of the alignment surfaces of pin guide 28 with the aligning surfaces of counter bores 48 and 44. The determination of tilt and concentricity, i.e., "alignment" of pin guide 28 and nozzle tip 22 with nozzle body 24, is effective to reduce or eliminate side loads on nozzle tip 22 and valve pin member 30 that can result from misalignment relative to nozzle body 24. Further, satisfactory alignment of nozzle tip 22 with nozzle body 24 is effective to achieve a seal between seal segment 21 of nozzle tip 22 with well 13, or alternatively, through bore 3, of mold block 18 that prevents leakage of melt past nozzle tip 22 into nozzle opening 11 of mold block 18. Still further, satisfactory alignment of pin guide 28 relative to nozzle body 24 is effective to achieve alignment of valve pin member 30 so as to reduce drag and wear of valve pin member 30 where it contacts pin guide vanes 33 and to reduce or eliminate misalignment of tip end 35 of valve pin member 30 with a valve seat, whether the valve seat comprises nozzle tip 22, mold block 18 or an insert within mold block 18.

While the invention has been described with reference to the preferred embodiments and while the preferred embodiments have been described in detail, it is to be noted that the invention is not limited to the preferred embodiments as shown and described. Variations from the preferred embodiments are expressly contemplated hereby. In particular, while skirt 37 is shown and described as being removable from nozzle body 24, it is contemplated that nozzle body 24 may comprise an integral skirt for precisely locating nozzle body relative to receptacle 15 of mold member 14. Further, while the preferred embodiment is described as providing for attachment of removable skirt 37 to nozzle body 24, it is contemplated that removable skirt 37 may be coupled to nozzle body 24 so as to be movable therewith when nozzle assembly 20 is installed in mold assembly 10, such coupling need not be by attachment of skirt 37 to nozzle body 24 in a manner so that skirt 37 is retained with nozzle body 24 when nozzle body 24 is removed from mold assembly 10. Still further, variations of combinations of devices effective to secure the nozzle body 24 from rotation can include any of the following: (i) a locking member comprising a flat for engaging a flat on skirt 37 in arrangements where skirt 37 is coupled with nozzle body 24 and the locking member is attached to nozzle retainer plate 14; (ii) a dowel or pin engaging both nozzle retainer plate 14 and a flat on one of nozzle body 24 and skirt 37, in arrangements where skirt 37 is coupled with nozzle body 24; and (iii) a flat or facet on skirt 37 engages a cooperating flat or facet on nozzle body 24 so as to prevent rotation of skirt 37 relative to nozzle body 24 and a pin or dowel engages skirt 37 and nozzle retainer plate 14 so as to prevent rotation of skirt 37. Further, while pin seal member 26 has been illustrated with a retaining fastener 55, it is contemplated that pin seal member 26 may be received in nozzle body 24 without such fasteners. Still further, while pin seal member 26 has been illustrated with a segment projecting into melt channel 25 and terminating with an oblique end face, it is contemplated that pin seal member 26 may terminate above the junction of melt channel 25 with the passage from nozzle inlet 32 and that termination may comprise an end face at right angles to longitudinal axis 60. Still further, while nozzle body 24 has been illustrated as being attached to manifold 12 by at least one fastener 57, it is contemplated that there will be no attachment whatsoever of nozzle body 24 to manifold 12. Still further, while it is contemplated that skirt 37 may be attached to nozzle body 24 by fasteners (not shown), it is contemplated that skirt 37 may be retained with nozzle body 24 by a removable retaining ring (not shown) located on nozzle body 24 and engaging skirt 37 so as to effect abutment of skirt 37 with a shoulder of nozzle body 24 as illustrated in FIG. 1. Still further, it is contemplated that there may be no attachment of or retention of skirt 37 with nozzle body 24 effective to keep skirt 37 with nozzle body 24 when nozzle assembly 20 is removed from mold assembly 10.

What is claimed is:

1. A nozzle assembly for selectably conveying material in a flowable condition to a cavity of a mold assembly, the nozzle assembly comprising:
   a) a nozzle body comprising a material inlet and a nozzle passage through the nozzle body in fluid communication with the nozzle inlet;
   b) a nozzle tip removably connected to the nozzle body, the nozzle tip comprising a nozzle tip passage through the nozzle tip and ending at a tip outlet, the nozzle tip passage in fluid communication with the nozzle passage when the nozzle tip is connected with the nozzle body and the nozzle tip outlet being in fluid communication with a mold cavity when the nozzle assembly is installed in a mold assembly;
   c) a valve pin member extending through the nozzle passage and nozzle tip passage and comprising a tip end portion adapted to form a seal with a valve seat so as to prevent the passage of material into the mold cavity, the valve pin member being translatable in the nozzle body so that the tip end selectably forms a seal with the valve seat; and
   d) a guide member partially received within the nozzle tip and partially received within the nozzle body, the guide member having an opening therethrough effective to guide the valve pin member within the nozzle body and guide member passages in fluid communication with the nozzle passage and the nozzle tip passage when the nozzle tip is connected with the nozzle body, the exterior of the guide member comprising at least one alignment surface so that with the tip installed in the nozzle body an alignment surface of the guide member is in contact with an interior aligning surface of the nozzle tip and so that an alignment surface of the guide member is in contact with an interior aligning surface of the nozzle body whereby the guide member is aligned relative to the nozzle body and the nozzle tip is aligned relative to the guide member whereby the nozzle tip is aligned relative to the nozzle body.

2. The nozzle assembly of claim 1 further comprising a valve pin member seal received in the nozzle body proximate the material inlet for forming a seal with the exterior surface of the valve pin member effective to prevent material flowing from the nozzle passage past the valve pin member and out of the nozzle body.

3. The nozzle assembly according to claim 2 wherein the valve pin member seal comprises a pin seal member at least partially received in a recess in the rear end face of the nozzle body.

4. The nozzle assembly according to claim 3 further comprising at least one fastener to secure the pin seal member to the nozzle body.

5. The nozzle assembly of claim 1 wherein the guide member comprises guide vanes, the valve pin member makes sliding contact with the guide vanes and the guide member passages are partially defined by the contact of the valve pin member with the guide vanes.

6. The nozzle assembly according to claim 1 wherein the nozzle tip further comprises a seal segment through which the tip outlet passes, the seal segment having an external circumferential surface adapted to form a seal with an internal circumferential surface of an opening of the mold member in fluid communication with a mold cavity.

7. The nozzle assembly according to claim 6 wherein the nozzle tip outlet comprises a gate defining the valve seat and the exposed end face of the nozzle tip comprises molding surfaces surrounding the gate.

8. The nozzle assembly according to claim 7 wherein, with the valve pin member advanced, the end face of the tip end is flush with the molding surfaces surrounding the gate of the nozzle tip.

9. The nozzle assembly according to claim 6 wherein the pin member tip end passes through the nozzle tip outlet to seal with a gate defined by a mold assembly in which the nozzle assembly is installed, the gate being in fluid communication with a mold cavity and comprising a valve seat.

10. The nozzle assembly according to claim 9 wherein, with the valve pin member advanced, the end face of the tip end is flush with the molding surfaces surrounding the gate of mold assembly.

11. The nozzle assembly according to claim 1 further comprising at least one heating device applied to the nozzle body and effective to maintain material within the nozzle body in a flowable condition.

12. The nozzle assembly according to claim 1 further comprising a skirt for precisely locating the nozzle body relative to a receptacle of a mold member, the skirt effective to minimize contact between the nozzle body and mold member to reduce heat transfer between the nozzle body and mold member.

13. The nozzle assembly according to claim 12 wherein the skirt is removable from the nozzle body so as to interpose a thermal barrier between the nozzle body and skirt at the surfaces of contact between the skirt and nozzle body.

14. The nozzle assembly according to claim 13 wherein the removable skirt is secured to the nozzle body by at least one fastener.

15. The nozzle assembly according to claim 12 wherein location of the skirt relative to the receptacle of the mold member is determined by abutment of surfaces of the skirt with surfaces of the receptacle.

16. The nozzle assembly according to claim 15 wherein location of the nozzle body relative to the skirt is determined by abutment of surfaces of the skirt with surfaces of the nozzle body.

17. The nozzle assembly according to claim 1 wherein the removable tip is connected with the nozzle body by a threaded connection so that the removable tip is attached to and removed from the nozzle body by relative rotation of the nozzle body and nozzle tip.

18. The nozzle assembly according to claim 17 further comprising means for securing the nozzle body in a mold assembly to prevent rotation of the nozzle body relative to the mold assembly.

19. The nozzle assembly according to claim 18 further comprising a skirt coupled to the nozzle body for precisely locating the nozzle body within a receptacle of a mold member so as to minimize contact between the nozzle body and mold member and a pin engaging the mold member and skirt so as to prevent rotation of the nozzle body about its longitudinal axis when installed in the mold assembly.

20. The nozzle assembly according to claim 18 further comprising a skirt coupled to the nozzle body for precisely locating the nozzle body within a receptacle of a mold member so as to minimize contact between the nozzle body and mold member and wherein one of the nozzle body and skirt comprises a flat for engagement with a cooperating flat of an anti-rotation locking member attached to a mold member after installation of the nozzle assembly in a mold assembly so as to prevent rotation of the nozzle body about its longitudinal axis.

\* \* \* \* \*